Aug. 3, 1954     U. TORRICELLI     2,685,286
MACHINE FOR TESTING REFLEX ACTIONS OF HUMANS
Filed Aug. 5, 1950     4 Sheets-Sheet 1
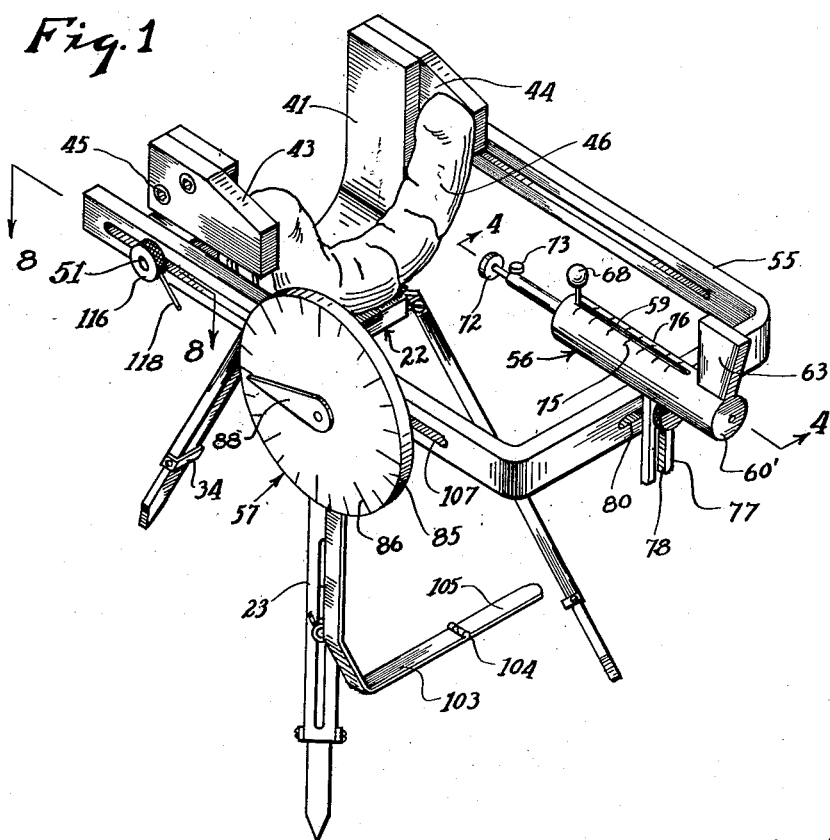
INVENTOR
UGO TORRICELLI
BY
L. S. Saulsbury
ATTORNEY Aug. 3, 1954  U. TORRICELLI  2,685,286
MACHINE FOR TESTING REFLEX ACTIONS OF HUMANS
Filed Aug. 5, 1950  4 Sheets-Sheet 2
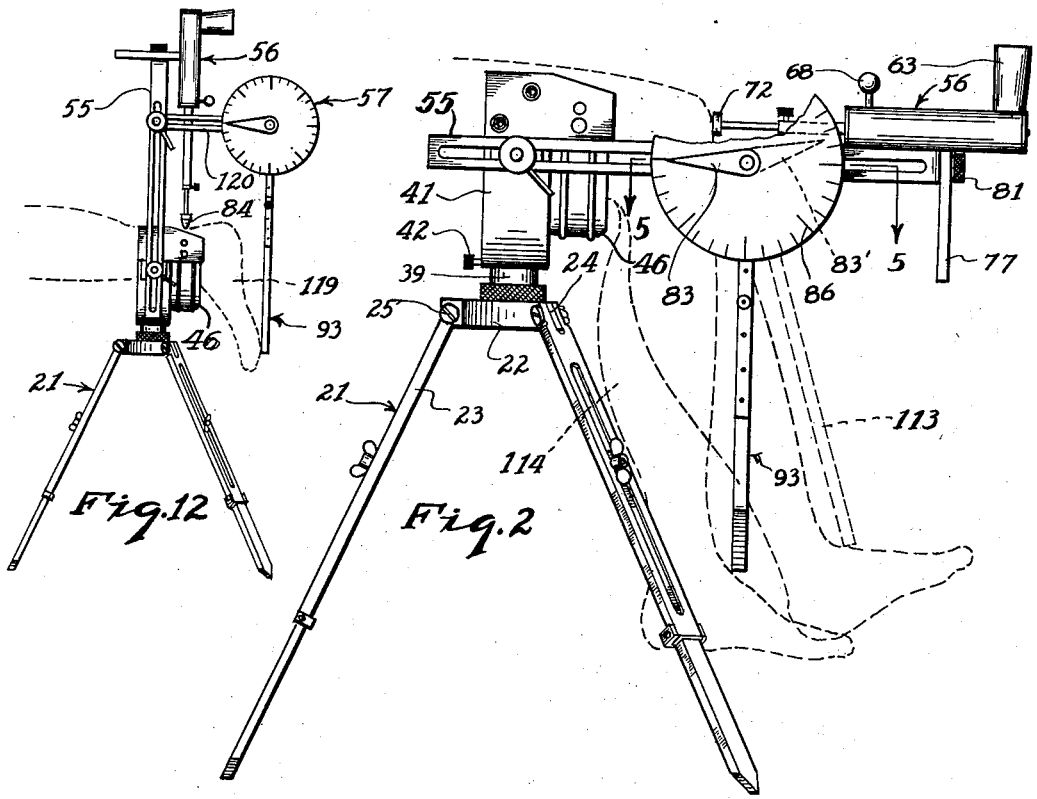
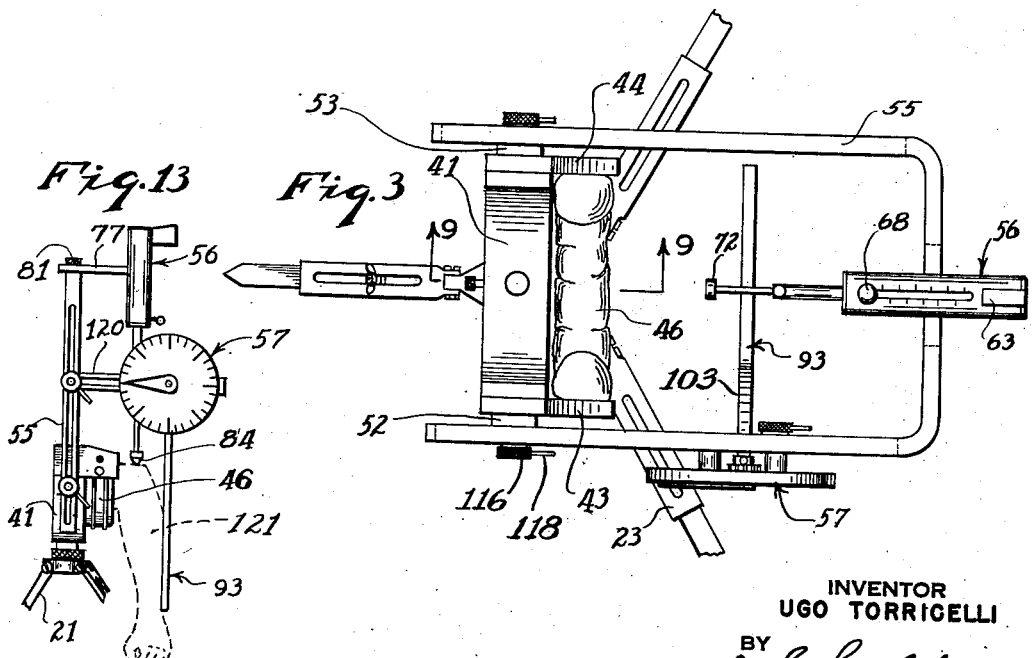
INVENTOR
UGO TORRICELLI
BY
L. S. Saulsbury
ATTORNEY Aug. 3, 1954
U. TORRICELLI
2,685,286
MACHINE FOR TESTING REFLEX ACTIONS OF HUMANS
Filed Aug. 5, 1950
4 Sheets-Sheet 3
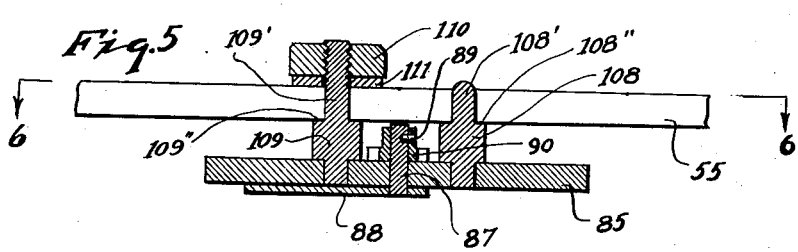
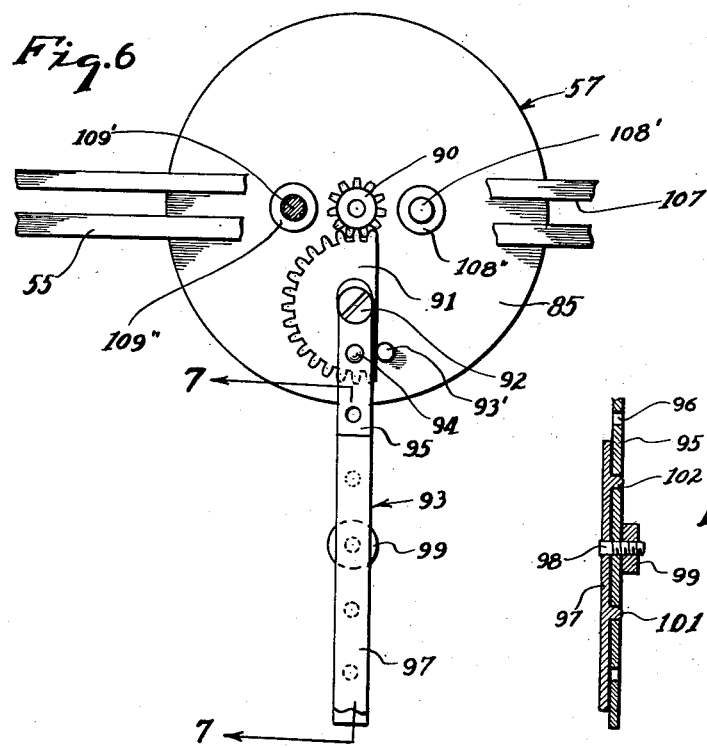
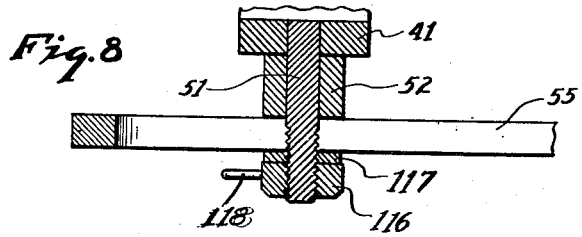
INVENTOR
UGO TORRICELLI
BY
L. S. Saulsbury
ATTORNEY Aug. 3, 1954    U. TORRICELLI    2,685,286
MACHINE FOR TESTING REFLEX ACTIONS OF HUMANS
Filed Aug. 5, 1950    4 Sheets-Sheet 4
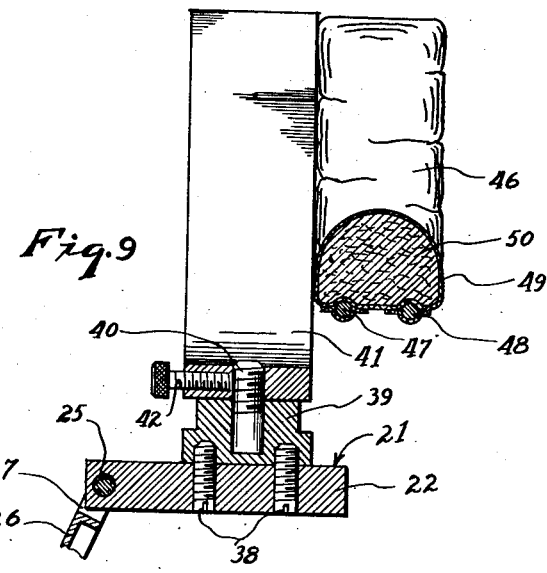
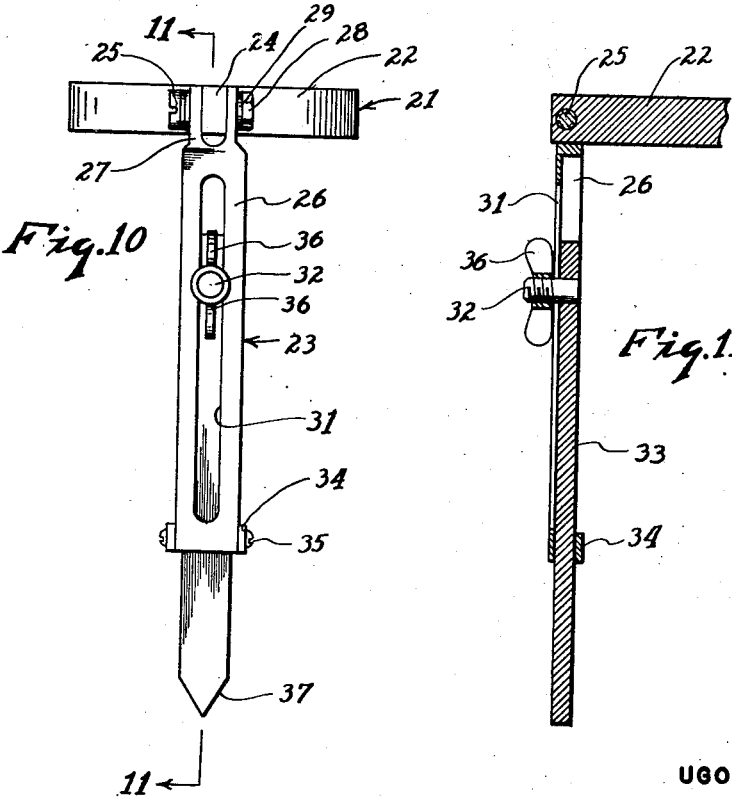
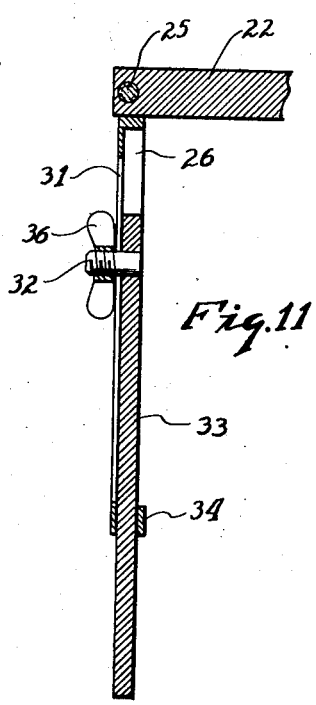
INVENTOR
UGO TORRICELLI
BY
L. S. Saulsbury
ATTORNEY Patented Aug. 3, 1954

2,685,286

UNITED STATES PATENT OFFICE 2,685,286

MACHINE FOR TESTING REFLEX ACTIONS OF HUMANS

Ugo Torricelli, New York, N. Y., assignor to Torricelli Creations, Inc., New York, N. Y., a corporation of New York Application August 5, 1950, Serial No. 177,884

9 Claims. (Cl. 128—2)

This invention relates to a machine for testing and measuring the reflex action of the limb joints of humans.

It is an object of the present invention to provide a machine adapted to receive and support a limb of a human in such a manner that the same can be struck to test the involuntary or reflex action of certain muscles of the limb when struck or occurring when the excitation is transmitted to a nerve center and reflected along an efferent nerve to the muscle being tested, and wherein the extent of movement of the limb will be visually indicated or recorded on a gauge or dial in response to a predetermined striking force upon the nerve.

It is another object of the present invention to provide a reflex action testing machine which is adjustable for use in testing either a leg, foot or forearm, and further wherein the parts of the machine are adjustable to accommodate different sizes of legs, feet or forearms.

It is another object of the present invention to provide in a reflex action testing machine a saddle support for comfortably supporting in the requisite position the leg, foot or arm being tested and wherein the striking device and the measuring member can be arranged upon the support for the proper relative engagement with the parts of the limb.

Other objects of the present invention are to provide a reflex action testing machine for humans which is of simple construction, inexpensive to manufacture, easy to set up and adjust for the different sizes of limb to be tested, has a minimum number of parts, is compact, collapsible for the purpose of being transported, and efficient in operation.

For other objects and for a better understanding of the invention, reference may be had to the following detailed description taken in connection with the accompanying drawings, in which:

Fig. 1 is a perspective view of the reflex action testing machine of the present invention.

Fig. 2 is a side elevational view of the machine set up to receive a limb of the patient.

Fig. 3 is a top plan view of the machine.

Fig. 4 is an enlarged longitudinal sectional view of the striking device taken generally on line 4—4 of Fig. 1.

Fig. 5 is an enlarged sectional view taken through the measuring dial device and generally on line 5—5 of Fig. 2.

Fig. 6 is a vertical sectional view taken generally on line 6—6 of Fig. 5 and looking upon the operating mechanism of the measuring dial device.

Fig. 7 is a fragmentary sectional view of the depending arm of the measuring device and as viewed on line 7—7 of Fig. 6

Fig. 8 is an enlarged longitudinal sectional view taken through the leg of the U-shaped supporting arm which supports the striking and measuring devices and through the connection of the same with the main limb supporting member, the view being taken generally on line 8—8 of Fig. 1.

Fig. 9 is an enlarged vertical sectional view taken through the main limb support and on line 9—9 of Fig. 3.

Fig. 10 is an elevational view of one of the legs of the tripod support.

Fig. 11 is a vertical sectional view of the tripod support taken on line 11—11 of Fig. 10.

Fig. 12 is an elevational view of the machine set up for use in testing the reflex action of the foot.

Fig. 13 is a fragmentary elevational view of the machine set up for testing the reflex action of the forearm.

Fig. 14 is a fragmentary sectional view of a modified form of striking element used for effecting the striking action upon the foot or arm.

Referring now to the drawings, the numeral 21 generally represents a tripod support having a top plate 22 and three adjustable legs 23 angularly spaced thereabout and hingedly connected respectively, to radial projections 24 by means of pivot pins 25. Each of the legs has an upper member 26 which has a bifurcated attaching portion 27 adapted to straddle a projection 24. The pivot pin 25 is in the form of a screw bolt and this bolt is held in place against axial displacement by nut 28 and washer 29. This nut, when the screw bolt 25 is made fast thereto, will make tight the bifurcated formations upon the sides of the projection 24 (Figs. 10 and 11).

The upper leg member 26 has an elongated slot 31 through which extends a threaded stud 32 on an adjustable leg member 33 which is adjustable with respect to the upper member and extends through a U-shaped guide clip 34 which is made secure by screws 35 to the lower end of the member 26. A wing nut 36 is adjustable upon the threaded stud 32 to secure the adjustable leg member 33 in its adjusted position upon the upper leg member 26. The lower end of the adjustable leg member 33 is pointed, as indicated at 37, to prevent the slippage of the leg upon the supporting floor surface.

Connected to the top face of the tripod plate 22, by means of vertically extending screws 38, is a vertical stud bracket 39 having an upwardly extending threaded stud 40 serving as a vertical pivot for U-shaped limb supporting member 41. This limb supporting member 41 is angularly adjustable to properly accommodate the limb and is secured in its adjusted position upon the stud 40 by a hand set screw 42. The upper ends of the legs of the U-shaped limb supporting member have forwardly extending brackets 43 and 44, respectively, which are made secure by screws 45 upon the respective legs. These brackets carry a padded U-shaped member 46 on which the limb is comfortably supported. This padded member 46 comprises downwardly curved supporting members 47 and 48 spaced from one another and to which a covering 49 is attached with padding or cushioning material 50 (Fig. 9).

Through either the pivotal adjustment of the legs or the extension of the adjustable leg member thereof, the padded support 46 can be elevated to the proper position. By virtue of the connection of the U-shaped support for the limb, as indicated at 41, the padded supporting member 46 can be angled in a horizontal plane to the most comfortable position for the patient and made secure by the set screw 42. This padded support 46 for the limb remains generally in the same position for either the leg, foot or arm of the patient, as illustrated in Figs. 2, 12 and 13.

Extending laterally outwardly from the side legs of the upwardly extending U-shaped limb supporting member 41 are threaded studs 51, Fig. 8, on which are respectively disposed annular spacing members 52 and 53 (Fig. 3). Pivotally and laterally adjustable upon the threaded studs 51 is a large U-shaped supporting member 55 which carries at its closed end a striking device 56 and on one of its legs a dial measuring device 57.

The striking device 56 comprises an outer sleeve 58 having a top elongated slot 59 (Fig. 4). In the opposite ends of the sleeve or casing 58 are plugs 60 and 60'. The plug 60 is made secure by a set screw 61 extending through the end of the sleeve 58 and into the plug 60. The plug 60' is made secure by the end of a threaded stud 62 extending from an upwardly extending handle 63 which can be grasped to adjust the device upon the laterally extending U-shaped support 55 and to effect the aiming of the device. The plugs 60 and 60' have, respectively, openings through which can be slid a sleeve 64. This sleeve has a collar 65 secured thereto by a set screw 66. An operating arm 67 extends from the collar outwardly through the elongated slot 59 and has a ball handle 68 thereon. Within the casing 58 and surrounding the sleeve 64 is a striking spring 69. This spring reacts between the rear plug 60' and the fixed collar 65, whereby to urge the forward movement of the sleeve to effect the striking action upon the limb of the patient. A rod 71 is longitudinally adjustable within the actuating sleeve 64. This rod 71 has fixed to its outer end a striking ball or element 72. This element 72 is aimed to strike the sensory nerve of the limb to effect the reflex action. To adapt the device 56 so that the striking element 72 will be the proper distance from the limb of the patient, the rod 71 can be adjusted in the sleeve 64 and made secure in its adjusted position thereupon by a hand set screw 73 that extends through a ring 74 on the end of the sleeve and through the sleeve 64. On the exterior surface of the sleeve casing 58 and at the opposite sides of the elongated opening 59 are graduations 75 and 76 by which the user of the device can determine the degree of striking force that is effected.

Fixed to the under side of the sleeve 58 of the device 56 is an attaching bracket 77 having a vertical slot 78 through which extends an attaching screw bolt 79 that extends also through an elongated horizontal slot 80 in the end of the U-shaped supporting member 55 so that lateral adjustment of the device 56 for proper alignment with the limb can be effected, and whereby, as the device is raised upon the supporting member 55, the same will be adjusted to give the proper vertical elevation. When the adjustments of the device upon the supporting member 55 have been made, a hand clamping nut 81 threaded upon the bolt 79 and a washer 82 will make secure the device upon the support 55. The striking head or element 72 has the raised central protrusion 72' for depressing the nerve and to concentrate the striking force.

In Fig. 14, the rod 71 is provided with a different form of striking head 84, which has a tapered point 84'. The striking head 84 is wide and provides line contact with the limb. This type of head is found to be more effective than the head 72 for use upon the foot and arm, as shown in Figs. 12 and 13.

The measuring dial device 57 is mounted axially on the limb receiving means, i. e., axially of its dial plate and comprises a dial plate 85 having angularly spaced graduations 86 on the front face thereof. Extending through the center of the dial plate for rotation therein is a pivot shaft 87 which has on its outer end an indicator or pointer 88 adapted to pass over the graduations 86 as the shaft 87 is turned. Fixed to the shaft on the rear of the plate 85 by set screw 89 is a pinion gear 90. In mesh with this pinion gear 90 is a gear segment 91 that is pivotally connected to the rear of the dial plate 85 by a threaded pivot screw 92, Fig. 6. This same screw secures to the gear 91 an operating arm arrangement 93. To prevent the angular displacement of the arm arrangement 93 upon the gear segment 91 there is on the gear segment 91 a stud pin 94 adapted to enter an opening in a member 95 forming a part of the operating arm arrangement 93.

The operating member 95 has a series of these openings equally spaced apart, Figs. 6 and 7. The openings are indicated at 96. On the member 95 is an adjustable arm member 97 having a threaded stud 98 adapted to enter any one of the openings 96 of the member 95 and to receive a hand nut 99 for securing the member 97 upon the member 95 and against lateral displacement therefrom. The member 97 has projections 101 and 102 which enter openings 96 and which will serve to hold the member 97 upon the member 95 against angular displacement relative thereto and the stud 98 in its opening. It will be clear that the adjustable member 97 can be located at different elevations upon the member 95 in order to adapt the operating arm arrangement 93 to the different uses of the machine and to the different sizes of limbs of the different patients being tested.

The lower end of the member 97 is bent inwardly to provide a horizontal portion 103 for engagement by the limb that is rested upon the padded pivot support 46. Hingedly connected, as indicated at 104, is an extension 105 that can be swung outwardly in order that the operating arm will be struck by the limb.

In the sides of the U-shaped supporting member 55 are elongated slots 107. To support the measuring dial device 57 in one of the slots 107, there extend from the dial plate 85 two shouldered studs 108 and 109 diametrically disposed from each other. These studs are secured to the plate 85 against axial displacement therefrom. The stud 108 has a rounded projection 108' that passes through the slot 107 and a shoulder 108'' that abuts the side face of the arm of the support 55. The shouldered stud 109 has a threaded projection 109' and a shoulder 109'' that abuts the side face of the supporting arm 55. These studs 108 and 109 are slidable along the slot 107 of the supporting member 55 and the device can be held in place by a tightening of nut 110 and washer 111 upon the threaded portion 109' of the stud 109. The washer 111 will engage with the inner face of the arm of the U-shaped supporting member 55.

The operating arm arrangement 93 will be kicked forwardly by the limb of the patient when the striking of the limb is effected and a reading of the amount of the reflex action can be had upon the graduations 86 of the dial plate. For example, the operating arm arrangement 93 may be kicked to a dotted line position, as shown in Fig. 2, at 113 and the pointer 83 may be extended to dotted line position, indicated at 83', from where a reading of the graduations 86 can be taken. A leg 114 will have been rested upon the padded limb support 46 and the striking device 56 aligned to strike the leg just below the knee. The horizontal portion 103 of the operating arm arrangement 93 will be engaged by the front of the foot to raise the operating arm arrangement and to obtain the reading Figs. 1 and 3.

To hold the U-shaped supporting member 55 in either the forwardly and horizontally extending position, as shown in Figs. 1, 2 and 3, or in vertical position, as shown in Figs. 12 and 13, there are provided on the trunnion pins 51 hand set nuts 116 and washers 117. The threaded pivot pins 51 extend respectively through the elongated slots 107 of the U-shaped supporting member 55 and upon the hand nuts 116 being loosened, the adjustment of the supporting member 55 can be made. The hand nuts have a radially extending operating arm 118 to make possible sufficient clamping action of the arms of the supporting member 55 against the ends of the annular spacing member 52 on the trunnion pins 51, Figs. 1, 3 and 8.

With the machine set up, as shown in Fig. 12, the reflex action of a foot 119 can be tested. The foot is struck at the rear of the ankle above the heel and the toe or ball of the foot will force outwardly the operating arm arrangement 93. The supporting member 55 will extend vertically and the devices 56 and 57 will be rearranged upon the supporting member to be extended to the proper locations. A special bracket or extension 120 is provided for the measuring dial device 57.

In Fig. 13, the machine is set up similar to that shown in Fig. 12 and adapted for use for testing the reflex action of an arm 121. The upper part of the arm is rested on the padded limb support 46 with the elbow up so that the striking device will engage the arm near the elbow. The arm will be flexed outwardly against the operating arm arrangement 93 to give the indication on the device 57. The striking device 56 is adjusted outwardly of the position shown in Fig. 12.

It will now be apparent that there has been provided a machine for testing the reflex actions of a human which has sufficient adjustability in order to adapt the limb of the patient to the machine and wherein there are provided graduations on both the striking device and upon the measuring indicator so that the amount of the reflex action corresponding to a predetermined amount of striking force can be recorded. If the striking force is great, it can be presumed that a greater reflex action will be had and the amount of this action, as given on the dial device 57, will be greater. It will be seen that every form of adjustment of the devices and of the support for the limb can be effected and quickly made in order to set up the machine for a particular limb of a particular patient and for different patients.

While various changes may be made in the details of construction, it is to be understood that such changes are deemed to be within the spirit and scope of the invention as defined by the appended claims.

I claim:

1. A machine for testing and measuring the reflex actions of humans comprising a support, means mounted upon the support for receiving a limb of a human, a measuring device connected to and actuated by a depending operating arm arrangement engageable by the limb of the patient to indicate the amount of the reflex action and means for mounting said measuring device axially on the limb receiving means, said measuring device including a dial having graduations thereupon, a shaft journalled in the dial and an indicator on the shaft adapted to point off the graduations of the dial, said operating arm arrangement depending from the dial, a gear secured to the upper end of the operating arm arrangement and pivotally connected to the dial plate and a pinion gear on said indicator shaft in mesh with said operating arm gear.

2. A machine for testing and measuring the reflex actions of humans comprising a support, means mounted upon the support for receiving a limb of a human, a measuring device connected to and actuated by a depending operating arm arrangement engageable by the limb of the patient to indicate the amount of the reflex action and means for mounting said measuring device axially on the limb receiving means, said measuring device including a dial plate and an indicator pivotally connected to the dial plate and movable thereover to indicate the amount of deflection of the limb, said operating arm arrangement being pivotally connected to the dial plate and connected with the indicator to operate the same, said operating arm arrangement depending below the dial plate and comprising upper and lower members adjustably connected together to vary the length of the said operating arm arrangement, said lower member being bent to provide a horizontal portion for engagement by the limb and extending in the path of movement of the limb.

3. A machine for testing and measuring the reflex actions of humans comprising a support, means mounted upon the support for receiving a limb of a human, a measuring device connected to and actuated by a depending operating arm arrangement engageable by the limb of the patient to indicate the amount of the reflex action and means for mounting said measuring device axially on the limb receiving means, said measuring device including a dial plate and an indicator pivoted for movement over the dial plate, said operating arm arrangement depending from the dial plate and being connected to the indicator, said operating arm arrangement having a horizontally extending portion at its lower end adapted to be engaged by the limb of the patient, and an extension hingedly connected to the horizontally extending portion of the operating arm arrangement and adapted to be hinged outwardly to lie in the path of movement of the limb.

4. A machine for testing and measuring the reflex actions of humans comprising a support, means mounted upon the support for receiving a limb of a human, a measuring device connected to and actuated by a depending operating arm arrangement engageable by the limb of the patient to indicate the amount of the reflex action and means for mounting said measuring device axially on the limb receiving means, a striking device adapted to apply a striking force of controllable magnitude upon a sensory nerve of the limb mounted on the limb receiving means, the extent of actuation of said measuring device being dependent upon and related to the striking force of said striking device, said limb receiving means including a limb support and a U-shaped member having legs extendable over opposite sides of the limb support, means for connecting said U-shaped member to the limb support for vertical pivotal adjustment, means for adjustably connecting the measuring device to the U-shaped member and means for adjustably connecting the striking device to the U-shaped member, whereby said devices may be aligned with any human limb for which the U-shaped member has been adjustably set.

5. A machine for testing and measuring the reflex action of humans comprising a support, means mounted upon the support for receiving a limb of a human, a measuring device connected to and actuated by a depending operating arm arrangement engageable by the limb of the patient to indicate the amount of the reflex action and means for mounting said measuring device axially on the limb receiving means, a striking device adapted to apply a striking force of controllable magnitude upon a sensory nerve of the limb mounted on the limb receiving means, the extent of actuation of said measuring device being dependent upon and related to the striking force of said striking device, the striking device comprising a sleeve casing, a bracket connected to the sleeve casing for effecting connection with the limb receiving means, plugs disposed in the opposite ends of the sleeve casing and having openings therein, striking means having a limb-engaging element thereon slidable through the openings in the plugs, a collar adjustable in the sleeve casing and fixed to said striking means and a handle connected to the collar, said sleeve casing having an elongated slot through which the handle of the collar extends, and spring means reacting between the collar and the rear plug head for applying a striking force to said striking means.

6. A machine for testing and measuring the reflex action of humans as defined in claim 5, in which said striking means includes a sleeve adjustable through the plug openings and a rod adjustable within the sleeve, said limb engaging element being disposed on one end of said rod and clamp means carried by the sleeve for holding the rod in an adjusted position extended from the end of said sleeve.

7. A machine for testing and measuring the reflex actions of humans comprising a support, means mounted upon the support for receiving a limb of a human, a measuring device connected to and actuated by a depending operating arm arrangement engageable by the limb of the patient to indicate the amount of the reflex action and means for mounting said measuring device axially on the limb receiving means, said limb receiving means including a U-shaped member, means for pivotally connecting the U-shaped member to the support for angular adjustment with respect thereto in a lateral plane, the legs of said U-shaped member having forwardly extending brackets and a padded U-shaped limb supporting member connected to the brackets and depending therefrom and adapted to receive and comfortably support the limb.

8. A device for testing and measuring limb reflex actions of humans which comprises, in combination, means for receiving and supporting a human limb in position for such testing and measuring, means forming a part of said device and mounted thereon for striking the positioned limb with a determinate force to cause proportionate reflex action thereof and means for indicating the extent of the reflex action produced by such amount of striking force, the first means being mounted on a horizontal plate provided with radially hinged extensible legs and having an extending supporting frame to which the striking and indicating means are connected for conjoint operation.

9. A neurological testing and measuring device comprising, in combination, a support for a human limb, a striking device mounted on a part of said support and aimable at a reflex of such limb and adapted to apply a determinate, controlled force thereupon to cause proportionate reflex action of the limb and operatively associated means connected to an extension of said support and actuated by the reflex action of the struck limb to measure and indicate the amount of the reflex action resulting from the applied striking force.

References Cited in the file of this patent

UNITED STATES PATENTS

| Number | Name | Date |
|---|---|---|
| 2,330,882 | Gray | Oct. 5, 1943 |
| 2,398,940 | Jones | Apr. 23, 1946 |

FOREIGN PATENTS

| Number | Country | Date |
|---|---|---|
| 44,018 | Austria | Sept. 10, 1910 |
| 378,307 | Germany | July 11, 1923 |
| 482,428 | France | Dec. 26, 1916 |